Patented June 19, 1928.

1,673,820

UNITED STATES PATENT OFFICE.

HARRY C. HETHERINGTON AND LOUIS A. PINCK, OF WASHINGTON, DISTRICT OF COLUMBIA, ASSIGNORS TO ARTHUR B. LAMB, TRUSTEE.

METHOD OF PRODUCING CYANAMIDE FROM CALCIUM CYANAMIDE.

No Drawing.  Application filed March 2, 1926.  Serial No. 91,830.

The subject of this invention is a method of producing cyanamide from calcium cyanamide, and relates more particularly to the production from crude calcium cyanamide.

One of the most serious limitations of processes requiring the aqueous extraction of crude calcium cyanamide has always been the difficulty of obtaining a high efficiency of extraction, while avoiding the conversion of cyanamide into other forms.

When calcium cyanamide is leached with water, there is obtained in solution the acid salt, $Ca(HCN_2)_2$. Due to partial hydrolysis, a solution of this salt itself is alkaline, while the slurry of crude calcium cyanamide is potentially even more so, owing to the presence of about 20% free lime in the latter material. It is well known that in alkaline solution, cyanamide is both polymerized and hydrolyzed according to the following equations:

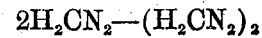
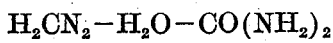

$$2H_2CN_2 - (H_2CN_2)_2$$

$$H_2CN_2 - H_2O - CO(NH_2)_2$$

These reactions are accelerated by an increase in temperature and, therefore, previous methods of aqueous extractions have stipulated that relatively low temperatures (for example, 30° C. or lower) be maintained during the operation if it is desired to avoid the formation of dicyandiamide. Under these conditions, even fairly efficient extraction with water requires agitation of the slurry for a protracted period, following which the slurry must be filtered and the calcium in the filtrate precipitated immediately. As a precipitating agent sulfuric acid has been recommended. In such a method of operation, the cost of sulfuric acid, the power required to agitate the slurry and the tie-up of apparatus all tend to limit the method largely to the preparation of relatively valuable chemicals.

To avoid the expense of sulfuric acid, and incidentally to obtain a concentrated extract, it has previously been proposed to treat the cyanamide slurry with carbon dioxide. Such methods necessitate the neutralization of the entire calcium content of crude calcium cyanamide. Moreover, there results an extremely thick slurry, in which the grains of $CaCN_2$ are coated with $CaCO_3$, necessitating an elaborate system of beaters, as well as pumps. The maintenance of the necessary neutral or acidic conditions in such a slurry is attainable only when the addition of calcium cyanamide is relatively slow.

Extraction with water alone possesses advantages over other methods, providing the extraction can be carried out rapidly. In investigating this possibility, we have found that the concentration of $Ca(HCN_2)_2$ obtainable by dissolving the pure salt $Ca(HCN_2)_2$ in water is far greater than that which would be obtained by extracting crude $CaCN_2$. We have also found that when a dilute solution of $Ca(HCN_2)_2$ is used to extract the crude $CaCN_2$, there is obtained in solution 70% of the nitrogen which would be dissolved by the same volume of pure water. It is evident, therefore, that the rate of solution and hydrolysis of $CaCN_2$ is greatly retarded by the presence of the product of hydrolysis, viz, $Ca(HCN_2)_2$.

However, we have found that a given volume of water at a temperature above 30° C., and more specifically, between 60 and 75° C., may dissolve as much $CaCN_2$ in less than five minutes as the same amount of water at 20° C. requires two hours to dissolve. It is evident that the retardation of solution and hydrolysis due to the presence of the acid salt is more than offset by the increase due to the higher temperature. In our process, advantage is taken of this increased rate of solution with increasing temperature of the solvent, and to avoid the extensive formation of dicyandiamide and urea which normally accompanies elevated temperature, the process is so operated that the stay of the hot liquid in contact with the slurry is as short as possible, the filtrate being continuously removed and cooled quickly, thus checking the two undesirable reactions.

In the operation of the invention, there is obtained rapidly a solution of $Ca(HCN_2)_2$ practically free from dicyandiamide or urea, from which solution the calcium may be readily removed by precipitation by well known means, as by sulfuric acid or carbon dioxide, but preferably by the use of carbon dioxide under pressure. By precipitating the calcium from the aqueous extract, instead of from the entire slurry, the necessity of neutralizing the free lime content of crude calcium cyanamide is avoided. An added advantage in this method of operation is the fact that the precipitation may be carried out in an extremely short period of time and the temperature rise due to neutralization of the calcium is very slight.

In all stages of the process, there is avoided the formation of dicyandiamide and urea in objectionable amounts, while advantage is taken of the rapid rate of solution of calcium cyanamide in hot water and the rapidity of calcium precipitation from the aqueous extract.

The invention consists chiefly in the novel combination of steps utilized to attain these objects.

In order that the invention may be clearly differentiated from prior art, the following description is given in detail, as an example of one manner in which the process may be carried out.

Crude calcium cyanamide, preferably free from carbide, is mixed with a small amount of water (for example, one part solids to one part water) and the slurry then run to a suitable filter (for example, a rotary drum filter). The temperature of the water used in making up the slurry may be that of the ordinary supply, or higher temperatures may be employed. In all cases we prefer to make up the slurry at approximately the rate at which it is being delivered to the filter, thus avoiding the formation of $H_2CN_2$ and $CO(NH_2)_2$, which would take place if the slurry were allowed to stand. The filter cake before removal from the filter is treated with hot water until practically all of the cyanamide is in solution, the temperature of the leaching water being governed by the rate at which filtration and cooling is carried out. Thus, with a very thin cake, and effective cooling, water at about 100° C. may be used. With the average cake of approximately ½ inch thickness, we prefer to use water at 60-75° C. The effluent is cooled as quickly as is practicable to about 20° C., as it is discharged from the filter. Such cooling may be rapidly effected by well known methods. For example, a heat interchanger may be employed to advantage, since it serves not only to cool the filtrate, but also to preheat the water required for leaching on the filter. The cool filtrate is led to precipitating vessels capable of withstanding pressure, in which vessels the calcium may be precipitated by means of dilute carbon dioxide,—such as for example, lime-kiln gases,—and/or concentrated carbon dioxide, preferably under pressure. The resultant slurry is then discharged either to filters or to settling tanks in which the calcium carbonate is removed, leaving a solution of free cyanamide containing very little calcium. This solution may then be accurately neutralized with a small amount of a mineral acid, preferably sulfuric acid, and safely concentrated to any density suitable for the production of urea and other derivatives of cyanamide. Moreover, if so desired, the solution may be concentrated to such a density that solid cyanamide, $H_2CN_2$, will crystallize on cooling and so be recovered in a relatively pure state.

It is realized that those skilled in the art might vary the details of the process above described by way of illustration, without departing from the spirit of this invention. We, therefore, do not wish to be limited to the above disclosure, except as may be required by the claims.

We claim:

1. The method of producing a solution of cyanamide practically free from dicyandiamide, comprising forming a slurry from crude calcium cynamide and water, filtering the slurry, treating the filter cake while still on the filter with water at over 30° C., cooling the filtrate to about 20° C., precipitating substantially all the calcium out of the cooled filtrate, and removing the precipitate.

2. The method of producing a solution of cyanamide, practically free from dicyandiamide, comprising forming a slurry from crude calicum cyanamide and water, filtering the slurry, treating the filter cake while still on the filter, with water at over 30° C., cooling the filtrate to about 20° C., precipitating substantially all the calcium, removing the precipitate, and neutralizing the remaining solution.

3. The method of producing a solution of cyanamide practically free from dicyandiamide, comprising forming a slurry of crude calicum cyanamide and water, filtering the slurry, leaching the filter cake while still on the filter with water at a temperature above 30° C., immediately cooling the filtrate, precipitating substantially all the calcium in the filtrate as carbonate, removing the carbonate, neutralizing the resulting solution.

4. The method of producing a solution of cyanamide practically free from dicyandiamide, comprising forming an aqueous slurry of crude calcium cyanamide, filtering the slurry, leaching the filter cake while still on the filter with water above 30° C., to produce a solution of calcium acid cyanamide, and precipitating spbstantially all the calcium with carbon dioxide under pressure.

5. The method of producing a concentrated solution of cyanamide, practically free from dicyandiamide, comprising forming an aqueous slurry of crude calcium cyanamide, filtering the slurry, leaching the filter cake while still on the filter with water at not less than 30° C., immediately cooling the filtrate, precipitating the calcium from the filtrate with carbon dioxide under pressure, removing the precipitate, neutralizing and concentrating the resulting solution.

6. The method of producing cyanamide practically free from dicyandiamide, including leaching calcium cyanamide on a filter with water at a temperature above 30° C., immediately cooling the filtrate whereby the formation of dicyandiamide in undesirable quantities is avoided, and removing the calcium from the effluent.

7. The method of producing cyanamide practically free from dicyandiamide, including leaching calcium cyanamide with water at a temperature between 60° and 100° C., immediately cooling the effluent whereby the formation of dicyandiamide in undesirable quantities is avoided, and removing the calcium from the effluent.

8. The method of producing cyanamide practically free from dicyandiamide, including leaching a homogenous porous mass of calcium cyanamide on a filter with water at a temperature above 30° C., immediately cooling the filtrate, and removing the calcium from the filtrate.

HARRY C. HETHERINGTON.
LOUIS A. PINCK.